(12) United States Patent
Dit Cordier et al.

(10) Patent No.: US 8,708,111 B2
(45) Date of Patent: Apr. 29, 2014

(54) DISK BRAKE EQUIPPED REDUCED-SIZE YOKE

(75) Inventors: Pascal Mary Dit Cordier, Bagnères de Bigorre (FR); Norbert Vanouche, Trelaze (FR); Philippe Barret, Angers (FR); Andre Gaye, Maisons Alfort (FR)

(73) Assignee: Robert Bosch GmbH, Stuttgart (DE)

( * ) Notice: Subject to any disclaimer, the term of this patent is extended or adjusted under 35 U.S.C. 154(b) by 1252 days.

(21) Appl. No.: 11/573,819

(22) PCT Filed: Aug. 12, 2005

(86) PCT No.: PCT/FR2005/002079
§ 371 (c)(1),
(2), (4) Date: Sep. 6, 2007

(87) PCT Pub. No.: WO2006/021682
PCT Pub. Date: Mar. 2, 2006

(65) Prior Publication Data
US 2008/0128223 A1 Jun. 5, 2008

(30) Foreign Application Priority Data
Aug. 19, 2004 (FR) .................................... 04 08974

(51) Int. Cl.
*F16D 65/38* (2006.01)
(52) U.S. Cl.
USPC .................................... 188/73.39; 188/73.45
(58) Field of Classification Search
USPC ............. 188/73.31, 18 A, 72.4, 73.39, 73.44, 188/73.45
See application file for complete search history.

(56) References Cited

U.S. PATENT DOCUMENTS

| 3,388,774 | A | * | 6/1968 | Burnett | 188/73.35 |
| RE32,470 | E | * | 8/1987 | Wright | 188/73.44 |
| 5,060,766 | A | | 10/1991 | Kondo | |
| 5,588,508 | A | * | 12/1996 | Le Deit | 188/73.31 |
| 5,749,445 | A | * | 5/1998 | Ruiz Busquets | 188/73.45 |
| 5,931,267 | A | | 8/1999 | Iwata et al. | |
| 6,161,658 | A | | 12/2000 | Becocci | |
| 2001/0013448 | A1 | | 8/2001 | Schorn et al. | |

FOREIGN PATENT DOCUMENTS

| EP | 0989320 | 3/2000 |
| FR | 2747751 | 10/1997 |
| JP | 61084238 | 6/1986 |
| JP | 11303905 | 11/1999 |

OTHER PUBLICATIONS

English Translation of Japanese Office Action dated Oct. 7, 2010 (7 pages).

* cited by examiner

*Primary Examiner* — Xuan Lan Nguyen
(74) *Attorney, Agent, or Firm* — Michael Best & Friedrich LLP

(57) ABSTRACT

A disk brake (1) usually comprises a caliper (2), a carrier (3) and friction means (8, 9). The caliper is slideably mounted on the carrier. To improve the braking performance of such a disk brake while reducing the manufacturing cost, the invention provides that a first friction means is retained rotationally by the carrier while a second friction means is retained rotationally by the caliper. The disk brake according to the present invention is also characterized in that the carrier has at least two guide pins (17, 18), the caliper being slideably mounted on the carrier via these two pins, the caliper having at least two bores (19, 20) able to receive one pin each.

20 Claims, 3 Drawing Sheets

DISK BRAKE EQUIPPED REDUCED-SIZE YOKE

BACKGROUND OF THE INVENTION

The invention relates to a disk brake of a motor vehicle. The object of the invention is to improve the braking performance of disk brakes while reducing the manufacturing cost of such disk brakes. The invention is more particularly intended for the automotive sector but could also be applied in other sectors.

A disk brake of a vehicle is usually situated on a hub of at least one wheel of the vehicle which hub receives an axle of the vehicle wheel and supports the disk brake. A disk brake is connected to the wheel of the vehicle in such a way that the wheel imparts a rotational movement to the brake disk.

The disk brake comprises a caliper forming a first jaw and a second jaw, the first jaw and the second jaw facing one another on either side of a plane of a brake disk and joining together outside the disk. The first jaw and the second jaw of the caliper are provided with a first brake pad and with a second brake pad, respectively. The brake pads are placed facing one another, on either side of the brake disk, in such a way that their plane of symmetry is coplanar. This caliper is intended to apply the first brake pad and the second brake pad via the first jaw and the second jaw, respectively, against a first face and against a second opposed face of a brake disk. A disk brake also comprises a carrier fixed to the hub of at least one wheel of the vehicle. The carrier supports the caliper and at least partially flanks each brake pad longitudinally with respect to a direction of the rotational movement of the brake disk.

During braking, the first brake pad and the second brake pad draw together perpendicularly with respect to a plane of the brake disk via the first jaw and via the second jaw. In order to draw together perpendicularly to the plane of the brake disk, at least one of the brake pads is first pushed toward the brake disk via a piston placed in at least one of the jaws of the caliper. The piston exerts a pressure, for example on the first brake pad, such that the piston tends to draw the first brake pad against the brake disk perpendicularly to the plane of this same brake disk. This piston moves under the action of at least one braking circuit generating a hydraulic pressure on the piston. The braking circuit may comprise a master cylinder of a vehicle, for example. The second brake pad is then directed perpendicularly toward the brake disk by a reaction of the other jaw moving in return toward the disk.

The carrier allows the caliper to be maintained straddling the disk. By straddling is meant the fact that the caliper is placed of either side of the plane of the disk while passing over the disk, outside a periphery of the disk. The carrier also allows the caliper to be guided during advancing/retreating movements of this same caliper with respect to the disk. The advancing movements of the caliper are produced during vehicle braking, causing the pads to be drawn together against the disk. The retreating movements of the caliper are produced during vehicle braking disengagement, causing the pads to be separated with respect to the disk.

To maintain the caliper in a straddling orientation and to guide the caliper, it is known for the carrier to have bores intended to receive guide pins carried by the caliper, the pins and the bores cooperating to produce the advancing/retreating movements of the caliper with respect to the disk. These pins allow the caliper to be supported by the carrier while facilitating the guiding of the two pads against the disk. The carrier extends above the disk with its bores so that the pins slide in these bores while also passing over the disk. The carrier keeps the two pads in position and it recovers the major part of the braking torque.

Document FR 2 747 751 describes a brake disk provided with a carrier and with a caliper. This document describes that the two guide pins are carried by the carrier and that the bores are formed in the caliper. These guide pins are each arranged with an axis parallel to a central axis of the disk. More specifically, these pins are arranged with one having an axis passing beyond the periphery of the disk and extending on either side of the disk and with the other having an axis passing inside this same periphery, the second pin extending on only one side of the disk. This specific arrangement of the axes of the pins makes it possible to substantially reduce the distance between these two axes, thereby resulting in minimum frictional torque. Jamming of the pins is thus minimized, and sliding can take place under optimum conditions.

However, this type of disk brake has the disadvantage of having a considerable weight. The braking performance is all the more reduced as a result.

SUMMARY OF THE INVENTION

To solve this problem, the invention makes provision to reduce the weight of a disk brake while increasing the braking performance. In particular, the invention provides that one of the pads is retained rotationally by the carrier and that the other pad is retained rotationally by the caliper. It is thus possible to provide a half-carrier extending on only one side of the plane of the disk. Such a form of the carrier makes it possible advantageously to reduce the weight of the disk brake and to improve the performance of the disk brake.

Thus, during vehicle braking the piston causes a first pad to move toward the disk, this first pad being retained rotationally by the carrier, while a second pad can be applied against the other face of the disk by reaction of the caliper while being retained rotationally by the caliper.

The movement of the caliper with respect to the carrier is brought about by cooperation of the pins and the respective bores. In the invention, provision is made for the pins to be carried by the carrier and for the bores to be formed by the caliper.

The caliper may advantageously have at least one window cut into it, thereby promoting better heat dissipation from the caliper. This also makes it possible to increase the arch width of the caliper and also to advantageously increase the stiffness of the caliper for an equivalent weight. Finally, this also makes it possible to reduce the weight of the caliper.

The brake pads may be fixed to the caliper and to the carrier by securing means, including screwing, attachment by at least one block, or by at least one spring.

The invention also makes it possible to increase a diameter of the disk for one and the same wheel.

More specifically, the subject of the invention is a disk brake for a motor vehicle, comprising a disk brake caliper, which caliper is provided with a hydraulic cylinder having a piston which is slideably mounted in this cylinder and with a nose, the caliper having a shape intended for straddling a disk, a carrier secured to the vehicle, the caliper being mounted so that it can move on the carrier, the disk being intended to be arranged between the nose and the piston and to rotate there, two frictional means arranged on either side of the disk and able to be applied against opposed faces of the disk by means of the piston and the nose, respectively, characterized in that a first friction means is retained rotationally by the carrier, and a second friction means is retained rotationally by the caliper.

BRIEF DESCRIPTION OF THE DRAWINGS

The invention will be better understood on reading the description below and from examining the accompanying figures. These are presented only by way of indication and without any limitation on the invention. In the figures.

DETAILED DESCRIPTION

Figure 1:
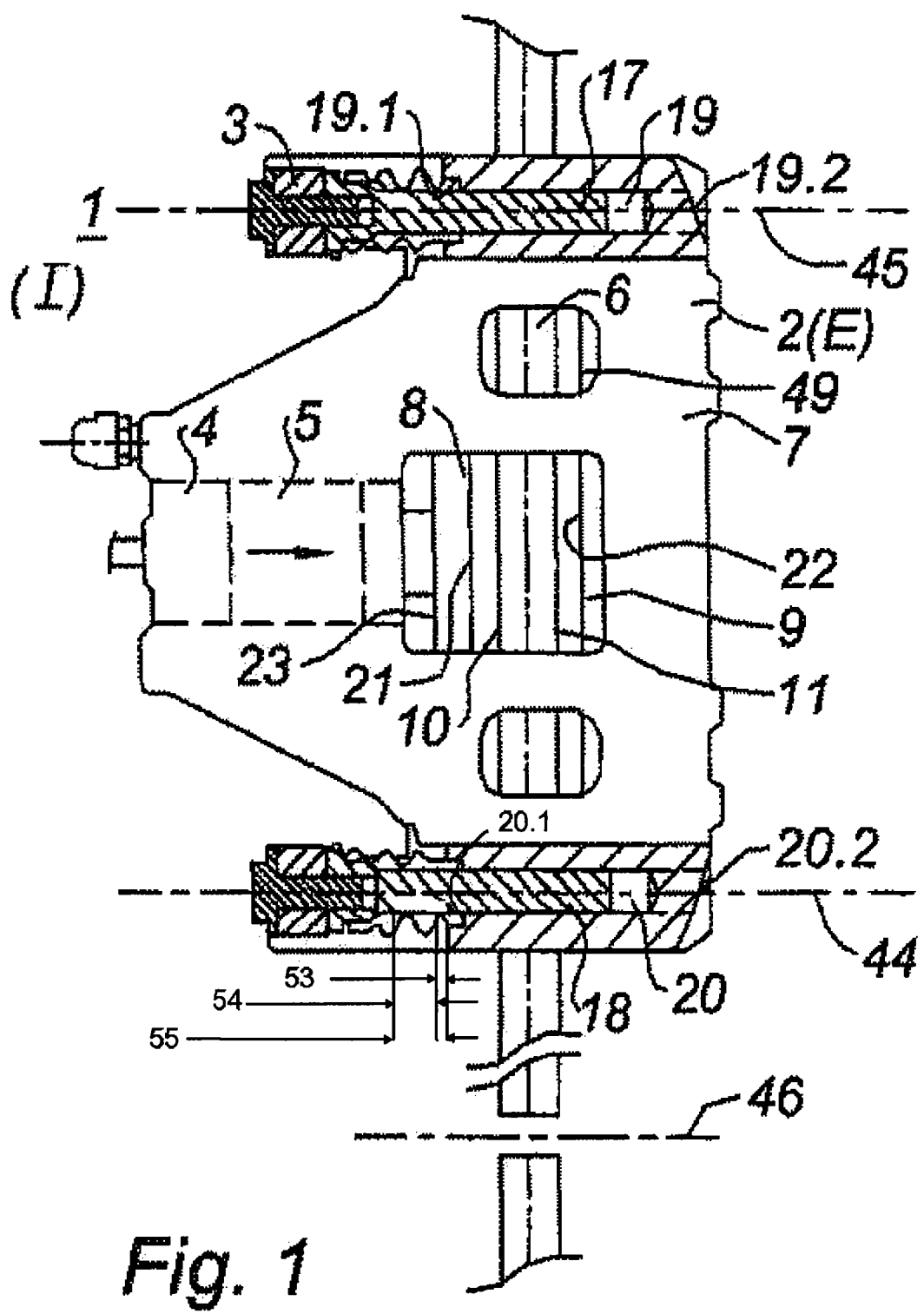
FIG. 1 shows a partial sectional view of a disk brake passing through a plane perpendicular to a plane formed by a brake disk, according to the invention.

FIG. 1 illustrates a disk brake 1 for a motor vehicle, according to the invention. The disk brake 1 comprises a caliper 2 and a carrier 3. The caliper 2 is provided with a hydraulic cylinder 4 having a piston 5 which is slideably mounted in this cylinder. The caliper 2 also has a nose 7. The carrier 3 is secured to the vehicle and the caliper is mounted so that it can move on the carrier. A disk 6 is interposed between the nose 7 of the caliper 2 and the piston 5 of this same caliper 2 while being intended to rotate. The caliper has a shape intended to straddle the disk 6. As mentioned above, by straddling is meant the fact that the caliper 2 is positioned on either side of a plane of the disk while being connected over the disk, outside a periphery of the disk. The disk 6 delimits, on either side of the plane of the disk, an external side (E) and an internal side (I), the external side being remote from a hub (not shown) of the vehicle and the internal side being in proximity to this same hub. The disk brake also comprises two friction means 8 and 9 arranged on either side of the plane of the disk 6. These friction means 8 and 9 are able to be applied against the opposed faces 10 and 11 of the disk via the piston 5 and the nose 7 of the caliper 2, respectively.

Figure 2:
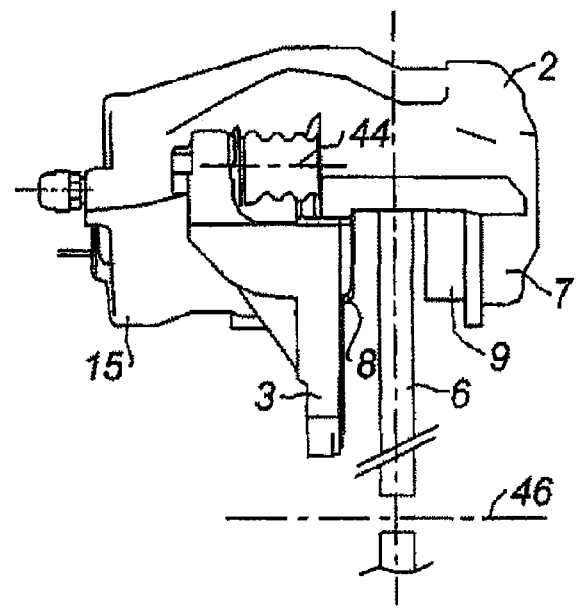
FIG. 2 shows a profile view of a disk brake, according to the invention.
Figure 3:
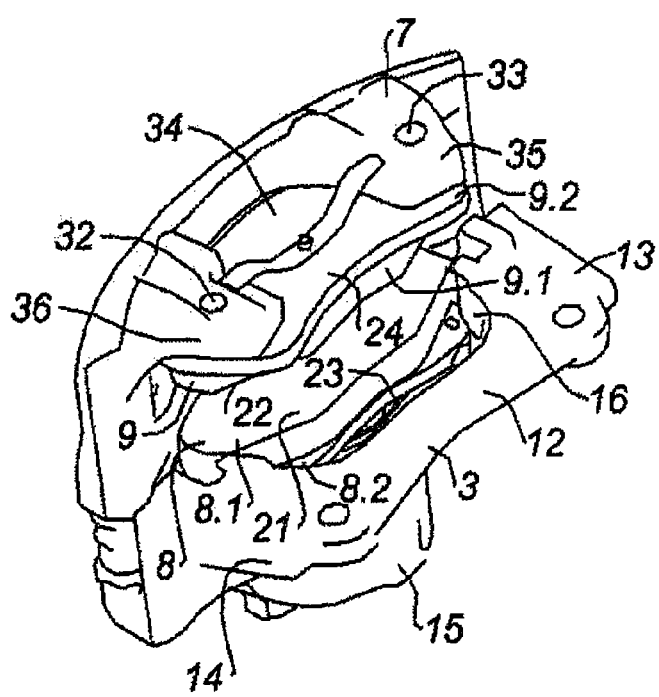
FIG. 3 shows a perspective view of a disk brake, according to the invention.

According to the invention, a first friction means 8 is retained rotationally by the carrier 3 and a second friction means 9 is retained rotationally by the nose 7 of the caliper 2 (FIGS. 2 and 3). The carrier 3 forms a yoke having an intermediate part 12, a first arm 13 and a second arm 14, the first arm 13 and the second arm 14 being connected by the intermediate part 12 (FIG. 3). In the preferred example of the invention (FIGS. 2 and 3), the carrier forms a half-carrier. The carrier extends in a plane parallel to a plane formed by the disk. It is not placed on either side of the plane of the disk.

The two arms 14 and 13 and the intermediate part 12 of the carrier 3 form a space 16 inside which is arranged the first friction means 8 (FIG. 3). A friction means 8, 9 is formed by a brake pad 8.1, 9.1 and by a pad support 8.2, 9.2 (FIG. 3). The pad support connects the corresponding pad to the nose of the caliper or to the carrier.

Each brake pad 8.1 and 9.1 has an inner face 21, 22 and an outer face 23 and 24, respectively, each of the outer faces being opposed to the disk and each of the inner faces being placed facing the disk.

The caliper 2 straddles the disk 6 while having a generally U-shaped form (FIG. 2). The caliper forms a first branch 15 of the U and a second branch 7 of the U. The second branch 7 forms the nose 7 of the caliper. The second friction means 9 is carried by the nose 7 of the caliper 2. The other branch 15 comprises the hydraulic cylinder 4 with the piston 5 slideably mounted in this same cylinder. The piston 5 is able to move the first friction means 8 toward the disk 6.

In a first exemplary embodiment, the caliper 2 is a one-piece component. In a variant, the caliper is formed in two parts (not shown), a first part carrying the piston and a second part carrying one of the friction means. The first part is connected to the second part by fixing means such as bolts.

The carrier 3 comprises two pins 17 and 18 which extend perpendicularly to the plane formed by the disk 6 (FIG. 1). These pins 17 and 18 are carried by the first arm 13 and by the second arm 14 of the carrier, respectively. The first pin and the second pin can be at least partially threaded in order to be introduced into a corresponding internally threaded cavity, which cavity is formed in a corresponding arm of the carrier. Such pins can be produced by stamping the material or by rolling.

Each pin 17, 18 extends along an axis 44 and 45, respectively, each of these axes being parallel to an axis 46 of rotation of the disk and perpendicular to the plane of the disk (FIGS. 1, 2). The first pin and the second pin are intended to slide through a corresponding bore 19 and 20. The first bore 19 and the second bore 20 are formed in the caliper 2 and are able to receive one pin each.

As represented in broken lines in FIG. 1, the bores are advantageously through bores such that each of these bores emerges at two opposed ends toward the internal side (1) and toward the external side (E). The first bore 19 emerges at a first end 19.1 toward the internal side (I) and at a second first end 19.2 toward the external side (E). The second bore 20 emerges at a first second end 20.1 towards the internal side (I) and at a second end 20.2 towards the external side (E).

Such through bores passing through two ends advantageously facilitate the machining of the caliper. It is no longer necessary to set a machining depth for the bores. It is thus intended to plug the second ends 19.2, 20.2 using a plug (not shown) which is screwed inside the corresponding bore.

On the other hand, such through bores can advantageously allow the caliper to slide with respect to the pins via one of the two ends in proximity to the internal side (I) on the one hand and, on the other hand, to fix by screwing the second friction means 9 via the other end remote from the internal side (not shown). It is the pad support 9.2 of this second friction means 9 which can be fixed to one of the ends of the bore that is remote from the internal side (I). Fixing this pad support 9.2 to such a bore end advantageously makes it possible to avoid having to plug the bores.

Finally, such emerging bores can advantageously facilitate removal of the disk brake from outside the vehicle. Specifically, at least one of the pins is provided at one of its free ends with a means for receiving an unscrewing tool, for example an Allen key.

As shown in FIG. 1, the caliper is able to slide during braking and brake disengagement by an efficient length 53 with respect to the pins. By efficient length 53 is meant a caliper sliding length with respect to the pins during vehicle braking. The efficient length 53 can be measured along an axis parallel to the axis of a pin. The bores of the caliper have an insertion length 55 greater than the efficient length 53 increased by the sum of the tolerable wear lengths 54 of the pads and the disk. In one example, the brake pads measure 2 centimeters thick and the columns can therefore be introduced into their corresponding bore by a length of 3 to 5 centimeters. The wear lengths 54 of the pads and the disk are measured along an axis parallel to the axis 46 of rotation of the disk or to the axis 44 of a pin.

Each brake pad can be connected to the corresponding support by small attachment studs formed by each of the pads intended to be inserted into corresponding cavities formed by the support. In the example shown in FIG. 4, the second pad 9.1 can be connected to the second pad support 9.2 by insertion of the studs such as 28, which are formed by the second pad 9.1 and are inserted in corresponding cavities 29 formed in the second pad support 9.2. The second pad 9.1 can be joined together with the second pad support 9.2 by pressing each of the studs 28 into a corresponding cavity 29. The studs and the cavities are represented in broken lines in FIG. 4.

At least one friction means can be connected to the nose of the caliper and/or to the carrier via projections and slots, the projections 30, 31 being able to engage in a slot 32, 33 formed in the carrier or in the nose of the caliper, the associated slots and projections forming means for securing the friction means to the carrier or to the caliper nose. The slots and the projections are produced in such a way that the corresponding pad hardly moves with respect to the caliper. The slots and the projections are also produced in such a way that there is virtually no axial clearance between the pad support and the caliper nose.

Figure 4:
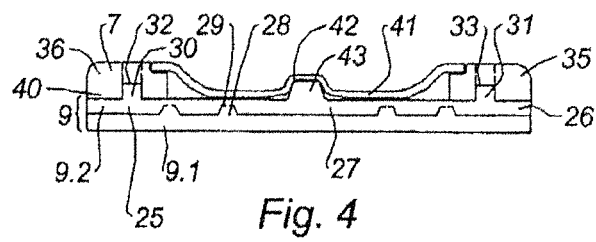
FIG. 4 shows a schematic representation of a friction means connected to a caliper, according to the invention.

The example shown in FIG. 4 schematically represents the second friction means 9 connected to the nose 7 of the caliper 2. This second friction means 9 comprises a brake pad 9.1 and a pad support 9.2. The second friction means 9 is connected to the nose of the caliper via the pad support 9.2. The pad support 9.2 has a first projection 30 and a second projection 31. Correspondingly, the caliper nose 7 has a first slot 32 and a second slot 33 receiving said projections 31 and 30. The slots and the projections are formed in such a way that the pad support provided with the pad is joined to the nose.

The caliper nose 7 carrying the second friction means 9 can be cut away in its center to form an orifice 34 which delimits, on either side of this same orifice, a first extension 35 and a second extension 36 (FIGS. 3 and 4). Such a shape of the caliper 2 makes it possible to reduce the weight of the disk brake according to the invention.

To retain the friction means on the nose of the caliper or on the carrier, a spring such as 41 can be fixed to a corresponding pad support while being placed in bearing contact against the caliper or the carrier. Specifically, in the example in FIG. 4, such a spring 41 intended to maintain the second friction means on the nose 7 of the caliper is formed by a metal strip 41 which can be placed from the first extension to the second extension while bearing against the first extension, against the second extension and against the corresponding pad support. This spring 41 extends parallel to the plane formed by the disk. This spring 41 allows the second friction means to be retained on the nose of the caliper while maintaining the second friction means in a floating configuration with respect to the nose.

The spring 41 connects the first extension to the second extension while attaching itself to the second friction means by way of securing means. Specifically, this spring 41 is formed from a metal plate which is locally deformed in its center to form a reception housing 42 (FIG. 2). This reception housing 42 receives a boss 43 formed correspondingly by the pad support 9.2. By being on the boss 43, the spring 41 bears on the one hand against the first extension 35 and against the second extension 36 on the other hand. The metal plate formed by the spring 41 tends to curve between the reception housing 42 and each of the locations where the spring 41 bears on the corresponding extensions.

Figures 5A, 5B:
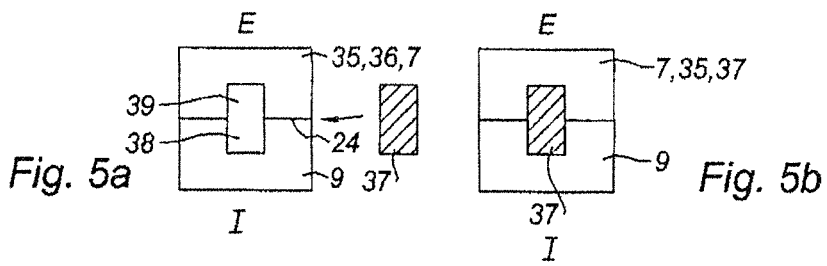
FIGS. 5a, 5b, 6 and 7 show schematic representations of a friction means connected to the caliper or to the carrier, according to variants of the invention.

In one variant, at least one support of a friction means is provided with at least a first recess 38 and the caliper nose and/or the carrier is provided with a second recess 39. At least one removable block 37 is partially housed in the first recess and in the second recess. In the example in FIGS. 5a and 5b, the second friction means can be connected to the nose of the caliper by the block 37 housed partially in the first recess 38 formed by the pad support 9.2 of the second friction means 9 and housed partially in the second recess 39 formed in the caliper nose. The block 37 can first be inserted in one of the two recesses 38 or 39, and then either the second friction means or the caliper is applied to this same second block 37 so as to imbricate this block 37 between the caliper nose and the second friction means. In this latter case, these recesses 38 and 39 are advantageously non-emerging.

Figure 6:
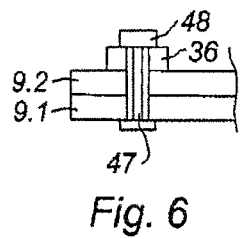

According to another variant of the invention, the second friction means can be connected to the nose of the caliper and/or to the carrier via at least one bolt 47 and one nut 48 (FIG. 6).

Figure 7:
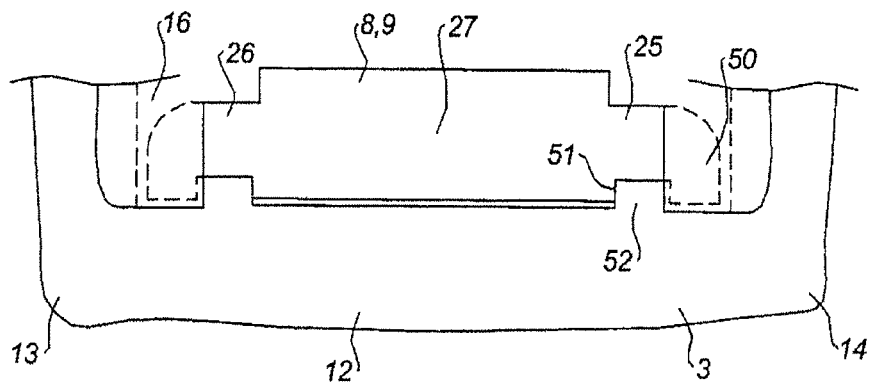

Each friction means has a first lug 25, a second lug 26 and a central body 27. In the example in FIG. 4, the second friction means 9 has a first lug 25 and a second lug 26 and a central body 27. According to another variant of the invention in FIG. 7, the lugs 25 and 26 of the corresponding friction means are prolonged to form a hook 50. The hook 50 is represented in broken lines in FIG. 7. This hook 50 delimits, together with the body 27 of the friction means, an insertion housing 51 inside which the carrier 3 or the nose 7 of the caliper 2 is inserted in a floating manner. To this end, the carrier or the caliper nose forms a protuberance 52 of complementary shape to the insertion housing. The housing 51 and the protuberance 52 are produced in such a way that the friction means is inserted in a floating manner in the carrier or in the caliper. The friction means thus floating is of the "pull push" type and thus takes up some of the braking torque and contributes to the stiffness of the carrier. In the example in FIG. 7, the first friction means is placed in the space 16. It is the intermediate part 12 which forms at least one protuberance 52 of complementary shape to the insertion housing.

To facilitate dissipation of heat from the disk brake according to the invention, the caliper can have at least one window such as 49 (FIG. 1). This window makes it possible to reduce the weight of such a disk brake and also makes it possible to promote a release of heat produced during vehicle braking resulting from the friction of the pads against the disk.

The disk has a center and a periphery, the center being a location of the disk at which the axis of rotation 46 of the disk is situated perpendicularly to the plane of the disk. The periphery of the disk delimits the disk. The material formed by the caliper can be distributed to a greater quantity in the vicinity of a first location and in the vicinity of a second location, the first location and the second location being placed along the periphery of the disk and opposing one another, than in the vicinity of a center of this same caliper likewise situated along the periphery of the disk. More precisely, the material formed by the caliper can be distributed with a larger quantity of material at a first location where the first bore is formed and at a second location where the second bore is formed than at a location corresponding to the center of this same caliper. Such a distribution of the material forming the caliper advantageously makes it possible to gain up to 20% braking absorption.

The invention claimed is:

1. Disk brake (1) for a motor vehicle, comprising:
   a disk brake caliper (2), which caliper is provided with a hydraulic cylinder (4) having a piston (5) which is slideably mounted in this cylinder and with a nose (7), the caliper straddling a disk (6);

a carrier (3) secured to the vehicle, the caliper being movably mounted on the carrier, the disk positioned and rotating between the nose and the piston;

first and second friction means (8, 9) arranged on either side of the disk and configured to be applied against opposed faces (10, 11) of the disk by means of the piston and the nose, respectively;

characterized in that the carrier (3) extends on only one side of a plane of the disk (6), and in that at least two pins (17, 18) extending from the carrier pass above the disk perpendicularly to the plane of the disk (6); and characterized in that the caliper is slideably mounted on the carrier via the pins, the caliper having a first bore and a second bore, each bore being configured to slideably receive one of the pins, the caliper supporting each pin on both sides of the plane of the disk (6), each bore being open to the carrier only in an area between the carrier and the plane of the disk, and the caliper receiving the pins only in the area between the carrier and the plane of the disk.

2. Brake according to claim 1, characterized in that the first friction means is arranged in a space (16) formed between two arms (13, 14) of a yoke formed by the carrier.

3. Brake according to claim 1, characterized in that:

the caliper straddles the disk while having a generally U-shaped form, a first branch (15) of the U and the nose (7) of the U extending parallel to the plane of the disk; and the second friction means is carried by one of the first branch and the nose of the U formed by the caliper, the other of the first branch and the nose of the U of the caliper comprising the hydraulic cylinder and the piston, the piston being able to move the first friction means toward the disk.

4. Brake according to claim 1, characterized in that:

each of the friction means (8, 9) has a brake pad (8.1, 9.1) and a pad support (8.2, 9.2); and the caliper is able to slide by an axial efficient length with respect to the pins during braking and brake disengagement, the bores furthermore having an axial insertion length greater than the efficient length increased by the sum of the tolerable wear lengths of the pads and the disk.

5. Brake according to claim 1, characterized in that:

the first bore and the second bore each configured as through bores to receive the pins for mounting the caliper on the carrier, each of the bores emerging at two opposed ends (19.1, 20.1, 19.2, 20.2), the first end serving to accommodate one of the pins, the second end being opposed thereto; and at least one of the friction means is fixed via the second end.

6. Brake according to claim 1, characterized in that at least one of the friction means is provided with a pad support having a first projection and a second projection configured to engage in a first slot and a second slot formed in one of the carrier and the nose of the caliper, wherein the projections and the associated slots are configured to secure the friction means to the one of the carrier and the nose.

7. Brake according to claim 6, characterized in that a guide spring (41) is interposed between the caliper or the carrier and the corresponding friction means while being placed around a boss of the pad support.

8. Brake according to claim 1, characterized in that:

a pad support of at least one of the friction means is provided with a first recess (38) and one of the caliper nose and the carrier is provided with a second recess (39); and a removable block (37) is partially housed in the first recess and in the second recess.

9. Brake according to claim 1, characterized in that at least one of the friction means is connected to one of the nose of the caliper and the carrier via at least one bolt (47) and one nut (48).

10. Brake according to claim 1, characterized in that the caliper nose carrying the second friction means forms an orifice (34) which delimits, on either side of the orifice, a first extension (35) and a second extension (36), the second friction means being fixed to the caliper nose via at least one of the first extension and the second extension.

11. Brake according to claim 10, characterized in that a spring (41) connects the first extension (35) to the second extension (36) while being attached to the second friction means by way of securing means.

12. Brake according to claim 1, characterized in that a material constituting the caliper is distributed such that a greater quantity of the material is located at a first location near the first bore and located at a second location near the second bore, than near a center of the caliper between the first location and the second location.

13. Brake according to claim 1, characterized in that at least one of the friction means (8, 9) has two lugs (25, 26) and a body (27), each of the lugs being prolonged to form a hook (50), the hook delimiting, together with the body, an insertion housing (51) intended to accommodate a protuberance (52) of complementary shape formed by one of the carrier and the caliper.

14. Brake according to claim 1, characterized in that each bore in the caliper extends on both sides of the plane of the disk (6).

15. Disk brake (1) for a motor vehicle, comprising:

a disk brake caliper (2), which caliper is provided with a hydraulic cylinder (4) having a piston (5) which is slideably mounted in this cylinder and with a nose (7), the caliper straddling a disk (6);

a carrier (3) secured to the vehicle, the caliper being movably mounted on the carrier, the disk positioned and rotating between the nose and the piston;

first and second friction means (8, 9) arranged on either side of the disk and configured to be applied against opposed faces (10, 11) of the disk by means of the piston and the nose, respectively;

characterized in that the carrier (3) extends on only one side of a plane of the disk (6), and in that at least two pins (17, 18) extending from the carrier pass above the disk perpendicularly to the plane of the disk (6); and characterized in that the caliper is slideably mounted on the carrier via the pins, the caliper having a first bore and a second bore, each bore in the caliper being configured to slideably receive one of the pins and extending on both sides of the plane of the disk (6), each bore being open to the carrier only in an area between the carrier and the plane of the disk, and the caliper receiving the pins only in the area between the carrier and the plane of the disk.

16. Brake according to claim 15, characterized in that the caliper supports each pin on both sides of the plane of the disk (6).

17. Brake according to claim 15, characterized in that the first friction means is arranged in a space (16) formed between two arms (13, 14) of a yoke formed by the carrier.

18. Brake according to claim 15, characterized in that:

the caliper straddles the disk while having a generally U-shaped form, a first branch (15) of the U and the nose (7) of the U extending parallel to the plane of the disk; and the second friction means is carried by one of the first branch and the nose of the U formed by the caliper, the other of the first branch and the nose of the U of the caliper comprising the hydraulic cylinder and the piston, the piston being able to move the first friction means toward the disk.

19. Brake according to claim 15, characterized in that:

each of the friction means (8, 9) has a brake pad (8.1, 9.1) and a pad support (8.2, 9.2); and the caliper is able to slide by an axial efficient length with respect to the pins during braking and brake disengagement, the bores furthermore having an axial insertion length greater than the efficient length increased by the sum of the tolerable wear lengths of the pads and the disk.

20. Brake according to claim 15, characterized in that:

the first bore and the second bore each configured as through bores to receive the pins for mounting the caliper on the carrier, each of the bores emerging at two opposed ends (19.1, 20.1, 19.2, 20.2), the first end serving to accommodate one of the pins, the second end being opposed thereto; and at least one of the friction means is fixed via the second end.

* * * * *